(12) United States Patent
Yasui et al.

(10) Patent No.: US 11,542,999 B2
(45) Date of Patent: Jan. 3, 2023

(54) VALVE AND SHOCK ABSORBER

(71) Applicants: KYB Corporation, Tokyo (JP); TOYOTA JIDOSHA KABUSHIKI KAISHA, Toyota (JP)

(72) Inventors: Takeshi Yasui, Aichi (JP); Kazuyuki Mizuno, Miyoshi (JP)

(73) Assignees: KYB CORPORATION, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/088,748

(22) Filed: Nov. 4, 2020

(65) Prior Publication Data

US 2021/0131517 A1 May 6, 2021

(30) Foreign Application Priority Data

Nov. 6, 2019 (JP) .............................. JP2019-201178

(51) Int. Cl.
*F16F 9/348* (2006.01)
*F16F 9/32* (2006.01)

(52) U.S. Cl.
CPC ............ *F16F 9/3485* (2013.01); *F16F 9/325* (2013.01); *F16F 9/3481* (2013.01)

(58) Field of Classification Search
CPC ......... F16F 9/3485; F16F 9/3481; F16F 9/325
See application file for complete search history.

(56) References Cited

U.S. PATENT DOCUMENTS

2015/0198214 A1 7/2015 Mizuno
2016/0258504 A1 9/2016 Mizuno et al.

FOREIGN PATENT DOCUMENTS

| CN | 105899837 A | 8/2016 | |
|---|---|---|---|
| EP | 1892436 A1 * | 2/2008 | ............ F16F 9/3485 |
| JP | H02-76937 A | 3/1990 | |
| JP | 2015-132313 A | 7/2015 | |
| JP | 2016-173140 A | 9/2016 | |
| JP | 201876920 A * | 5/2018 | |
| WO | WO-2015064643 A1 * | 5/2015 | ............ F16F 9/3484 |
| WO | WO-2017215854 A1 * | 12/2017 | ............ F16F 9/3415 |
| WO | 2019194168 A1 | 10/2019 | |

* cited by examiner

*Primary Examiner* — Melody M Burch
(74) *Attorney, Agent, or Firm* — Rabin & Berdo, P.C.

(57) ABSTRACT

A damping valve includes: a ring-shaped leaf valve having either one of an outer circumference and an inner circumference as a free end, the free end being allowed to be deflected toward both sides in the axial direction; a ring-shaped opposing portion that opposes the free end of the leaf valve with a gap; a first sub leaf valve stacked on one side of the leaf valve in the axial direction; and a first passage formed in the leaf valve so as to extend in parallel with the gap, the first passage being configured to be opened when the leaf valve is deflected in the direction away from the first sub leaf valve.

2 Claims, 9 Drawing Sheets

VALVE AND SHOCK ABSORBER

TECHNICAL FIELD

The present invention relates to a valve and a shock absorber provided with the valve.

BACKGROUND ART

Conventionally, valves are used, for example, for generating a damping force by imparting resistance to a flow of liquid that is caused during extension/contraction of a shock absorber. As such valves, there is a known valve that is provided with: a leaf valve, in which the one of an inner circumference and an outer circumference is formed as a fixed end and the other thereof is formed as a free end that is allowed to be deflected in both sides in the axial direction; and an opposing portion with a ring-shaped opposing surface that protrudes toward an end surface of the free end of the leaf valve so as to form a minute gap with the end surface of the free end in a state in which the opposing portion opposes to the end surface (for example, see JPH 2-76937A).

In the above-described configuration, because the minute gap is formed between the end surface of the free end of the leaf valve and the opposing surface of the opposing portion, even in a state in which the end surface and the free end are opposed to each other, an end portion of the leaf valve on the free end side can move in both sides in the axial direction from a position at which the end surface thereof opposes to the opposing surface of the opposing portion to a position at which the end surface and the opposing surface are no longer opposed to each other. With such a configuration, as an extension/contraction speed (piston speed) of the shock absorber is increased, the end portion of the leaf valve on the free end side is deflected such that the end surface thereof and the opposing surface of the opposing portion come to no longer be opposed to each other. As a deflected amount of the leaf valve is increased along with the increase in the piston speed, the gap formed between the free end and the opposing portion is increased to increase a flow amount of liquid passing through the leaf valve.

SUMMARY OF INVENTION

In the above description, in order to improve durability of the leaf valve, it is preferable that the deflected amount of the leaf valve be made small while ensuring the flow amount of the liquid passing through the leaf valve. In order to make the deflected amount small while ensuring the flow amount of the liquid passing through the leaf valve, lengths in the axial direction (thicknesses) of the opposing surface and the opposing portion in the vicinity of the opposing surface need to be reduced such that, even if the deflected amount of the leaf valve is small, the end surface of the free end of the leaf valve and the opposing surface come to no longer be opposed to each other. However, from the viewpoint of ensuring sufficient structural strength, etc., there is a limitation in reduction of the length of the opposing portion in the axial direction, and so, in the conventional valve, it is difficult to improve the durability of the leaf valve while ensuring the flow amount of the liquid passing through the leaf valve.

An object of the present invention is to provide a valve and a shock absorber that are capable of improving durability of a leaf valve while ensuring flow amount of liquid passing through the leaf valve.

According to an aspect of the present invention, the valve includes: a ring-shaped leaf valve having either one of an outer circumference and an inner circumference as a free end, the free end being allowed to be deflected toward both sides in the axial direction; a ring-shaped opposing portion that opposes the free end of the leaf valve with a gap; a first sub leaf valve stacked on one side of the leaf valve in the axial direction; and a first passage formed in the leaf valve so as to extend in parallel with the gap, the first passage being configured to be opened when the leaf valve is deflected in the direction away from the first sub leaf valve.

DESCRIPTION OF EMBODIMENTS

Figure 1:
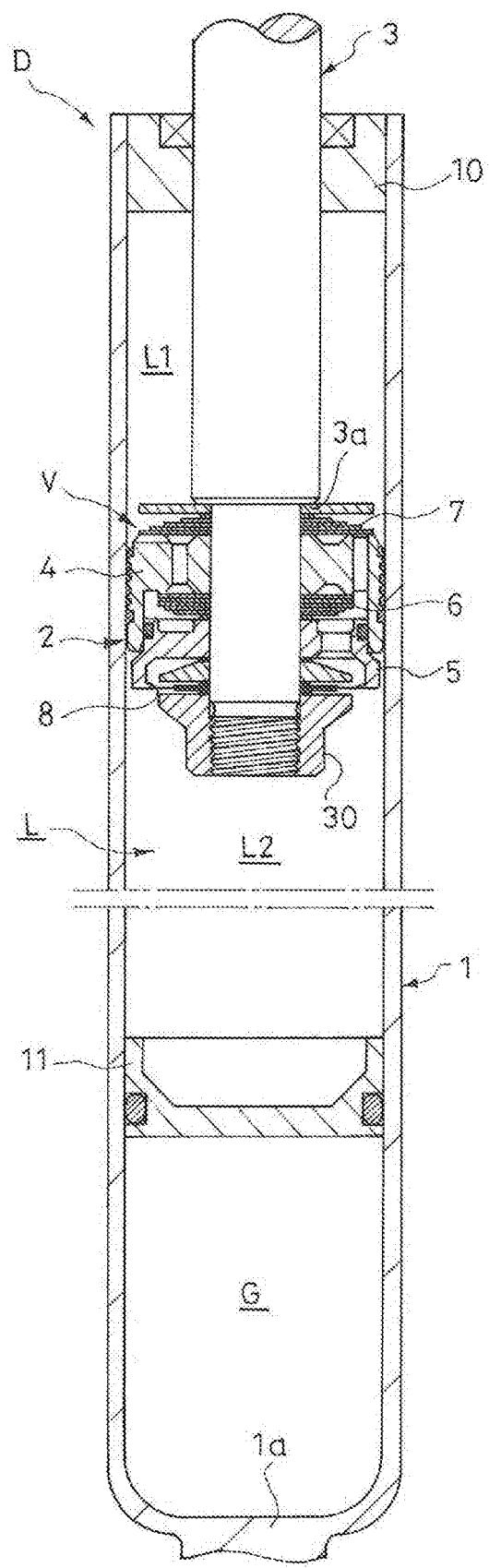
FIG. 1 is a longitudinal sectional view showing a shock absorber provided with a damping valve that is a valve according to an embodiment of the present invention.

An embodiment of the present invention will be described below with reference to the drawings. The same reference sings given throughout some of the figures in the drawings indicate the same components (portions) or the corresponding components (portions).

As shown in FIG. 1, the valve according to the embodiment of the present invention is a damping valve V that is provided in a piston portion of a shock absorber D. The shock absorber D is interposed between a vehicle body and an axle of a vehicle such as an automobile, etc. In the following description, for the sake of convenience of description, the top and bottom of the shock absorber D shown in FIG. 1 are referred to simply as "up" and "down", unless an explicit description is specifically given.

An installation target of the shock absorber provided with the valve according to the embodiment of the present invention is not limited to the vehicle, and it may be changed appropriately. In addition, the vertical orientation of the shock absorber in an installed state may be appropriately inverted in accordance with the installation target. Specifically, the shock absorber D of this embodiment may be installed to the vehicle in the same orientation as that in FIG. 1, or the shock absorber D may be installed to the vehicle in the vertically inverted orientation from the orientation shown in FIG. 1.

Next, a specific structure of the above-described shock absorber D will be described. As shown in FIG. 1, the shock absorber D is provided with a cylinder 1 having a bottomed barrel shape, a piston 2 that is inserted into the cylinder 1 in a freely slidable manner, and a piston rod 3 that is linked to the piston 2 at its lower end such that an upper end thereof projects out from the cylinder 1.

A bracket (not shown) is provided on the upper end of the piston rod 3, and the piston rod 3 is linked to the one of the vehicle body and the axle via the bracket. On the other hand, a bracket (not shown) is also provided on a bottom portion 1a of the cylinder 1, and the cylinder 1 is linked to the other of the vehicle body and the axle via the bracket.

As described above, the shock absorber D is interposed between the vehicle body and the axle. When wheels are vibrated vertically relative to the vehicle body as the vehicle travels on an irregular road surface, for example, the piston rod 3 is moved into and out from the cylinder 1, and thereby, the shock absorber D is extended/contracted and the piston 2 is moved vertically (in the axial direction) within the cylinder 1.

In addition, the shock absorber D is provided with a ring-shaped cylinder head 10 that seals an upper end of the cylinder 1 and that supports the piston rod 3 in a freely slidable manner. On the other hand, a lower end of the cylinder 1 is sealed by the bottom portion 1a. With such a configuration, an interior of the cylinder 1 is formed as a sealed space. In the cylinder 1, a free piston 11 is inserted in a freely slidable manner on the opposite side of the piston rod 3 with respect to the piston 2.

A liquid chamber L filled with liquid such as working oil, etc. is formed above the free piston 11 in the cylinder 1. On the other hand, a gas chamber G filled with a compressed gas such as air, nitrogen gas, or the like is formed under the free piston 11 in the cylinder 1. As described above, the interior of the cylinder 1 is partitioned by the free piston 11 into the liquid chamber L and the gas chamber G.

When the shock absorber D is extended, the piston rod 3 moves out from the cylinder 1, and the volumetric capacity in the cylinder 1 is increased by an amount corresponding to the volume of the piston rod 3 that has moved out. As a result, the free piston 11 is moved upward within the cylinder 1 so as to cause the gas chamber G to be expanded. In contrast, when the shock absorber D is contracted, the piston rod 3 moves into the cylinder 1, and the volumetric capacity in the cylinder 1 is decreased by an amount corresponding to the volume of the piston rod 3 that has moved in. As a result, the free piston 11 is moved downward within the cylinder 1 so as to cause the gas chamber G to be contracted.

As described above, in this embodiment, the shock absorber D is of a single rod, mono-tube type, and the volume of the piston rod 3 that is moved into and out from the cylinder 1 is compensated by the gas chamber G. However, the configuration of the shock absorber D is not limited thereto. For example, instead of using the gas chamber G, the volume of the piston rod that is moved into and out from the cylinder may be compensated by providing a reservoir for receiving the liquid and gas and allowing exchange of the liquid between the cylinder and the reservoir when the shock absorber is extended/contracted. Furthermore, the shock absorber may be formed as a twin rod type so that piston rods are provided on both sides of the piston. In this case, it is possible to omit the configuration for compensating the volume of the piston rod itself.

Next, the liquid chamber L in the cylinder 1 is partitioned by the piston 2 into an extension side chamber L1 on the piston rod 3 side and a contraction side chamber L2 on the other side thereof (the counter-piston rod side). The piston 2 is configured to have two valve discs 4 and 5 that are arranged in the longitudinal direction and held on the outer circumference of the piston rod 3 by being clamped between a step 3a that is formed on an outer circumference of the piston rod 3 and a nut 30 that is threaded to a tip end portion of the piston rod 3.

Among the two valve discs 4 and 5, the valve disc 4 on the upper side (the extension side chamber L1 side) is mounted with an extension side main valve 6 and a contraction side main valve 7. On the other hand, the valve disc 5 on the lower side (the contraction side chamber L2 side) is mounted with a super-low speed valve 8. Thus, the damping valve V is formed by including the two valve discs 4 and 5, the extension side main valve 6, the contraction side main valve 7, and the super-low speed valve 8. In the following, respective members forming the damping valve V will be described in detail.

Figure 2:
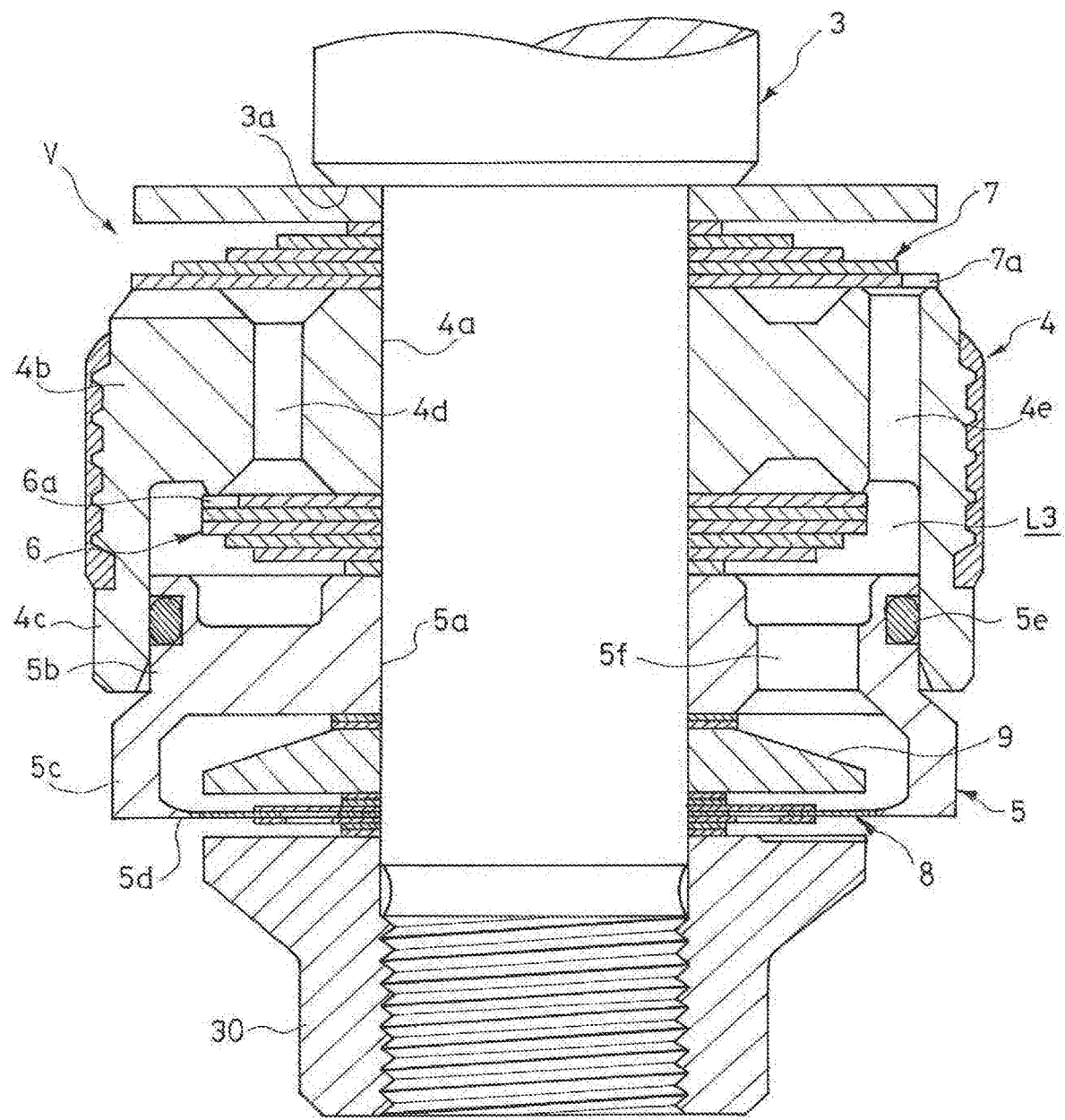
FIG. 2 is a partially enlarged view showing, in enlarged form, a piston portion in FIG. 1.

As shown in FIG. 2, the upper side valve disc 4 includes a ring-shaped main body portion 4b that is formed with, at its center portion, an attachment hole 4a for allowing insertion of the piston rod 3 and a barrel skirt portion 4c that protrudes downward from a lower-end outer circumference portion of the main body portion 4b. Furthermore, in the main body portion 4b, extension side ports 4d and contraction side ports 4e that respectively open at an inner circumferential side of the skirt portion 4c and that respectively penetrate the main body portion 4b in the axial direction are formed. The extension side ports 4d are opened/closed by the extension side main valve 6 that is stacked on the lower side of the main body portion 4b, and the contraction side ports 4e are opened/closed by the contraction side main valve 7 that is stacked on the upper side of the main body portion 4b.

In addition, the lower side valve disc 5 includes: a ring-shaped fitting portion 5b that is formed with, at its center portion, an attachment hole 5a for allowing insertion of the piston rod 3 and that fits into an inner circumference of the skirt portion 4c of the upper side valve disc 4; a sleeve portion 5c that protrudes downward from a lower-end outer circumference portion of the fitting portion 5b; and a ring-shaped opposing portion 5d that protrudes radially inward from the lower end of the sleeve portion 5c. A gap between the fitting portion 5b and the skirt portion 4c is sealed by a seal 5e, and a communication hole 5f through which the inside of the skirt portion 4c and the inside of the sleeve portion 5c are communicated is formed in the fitting portion 5b. The seal 5e may be omitted if the gap between the fitting portion 5b and the skirt portion 4c can be sealed by press-fitting the fitting portion 5b into the skirt portion 4c. Furthermore, a valve stopper 9 and the super-low speed valve 8 are stacked on the lower side of the fitting portion 5b, and the super-low speed valve 8 is provided so as to close an opening of an opposing portion 5d that is positioned at the lower end of the sleeve portion 5c.

With such a configuration, the liquid directed from the main valves 6 and 7 toward the contraction side chamber L2 flows through the inside of the skirt portion 4c of the upper side valve disc 4, the inside of the communication hole 5f and the sleeve portion 5c of the lower side valve disc 5, and the super-low speed valve 8 in this order. In contrast, the liquid directed from the contraction side chamber L2 toward the main valves 6 and 7 flows the above-described route in the reverse direction. As described above, the super-low speed valve 8 in this embodiment is provided at an intermediate position in the passage through which the extension side chamber L1 and the contraction side chamber L2 are communicated so as to be in series with the main valves 6 and 7. In the following, a space formed from the inside of the skirt portion 4c to the inside of the sleeve portion 5c so as to be positioned between the main valves 6 and 7 and the super-low speed valve 8 is referred to as an intermediate chamber L3.

Each of the extension side main valve 6 and the contraction side main valve 7 is formed so as to have one or more leaf valves. Each of the leaf valves is a thin ring-shaped plate having an elasticity, and each of the main valves 6 and 7 is fixed to the valve disc 4 at its inner circumferential side so as to allow deflection of the outer circumferential side thereof. Thereby, outlets of the corresponding ports 4d or 4e are opened/closed by allowing its outer circumference portion to be seated on and separated from the valve disc 4.

Inlets of the extension side ports 4d open to the extension side chamber L1, and the pressure in the extension side chamber L1 acts in the direction in which the outer circumference portion of the extension side main valve 6 is deflected downward and the extension side ports 4d are opened. On the other hand, inlets of the contraction side ports 4e open to the intermediate chamber L3, and the pressure in the intermediate chamber L3 acts in the direction in which the outer circumference portion of the contraction side main valve 7 is deflected upward and the contraction side ports 4e are opened.

Furthermore, notches 6a and 7a are each formed in an outer circumference portion of a first leaf valve that is positioned on the extreme valve disc 4 side among the leaf valves forming the extension side main valve 6 and the contraction side main valve 7. With such a configuration, even when the extension side main valve 6 and the contraction side main valve 7 are closed, orifices are formed by the notches 6a and 7a, and the liquid can flow back and forth between the extension side chamber L1 and the intermediate chamber L3 through the orifices.

The orifices formed by the above-described notches 6a and 7a allow flow of the liquid in both directions. Thus, either one of the notches 6a and 7a formed in the extension side main valve 6 and the contraction side main valve 7, respectively, may be omitted. In addition, a method for forming the orifices may be changed appropriately. For example, a groove may be formed on the valve seat on and from which the extension side main valve 6 or the contraction side main valve 7 is seated/separated, and the orifices may be formed by the groove. In addition, a choke may be used instead of the orifices. Furthermore, the main valve may be a valve other than the leaf valve, such as a poppet valve, etc.

Figure 3:
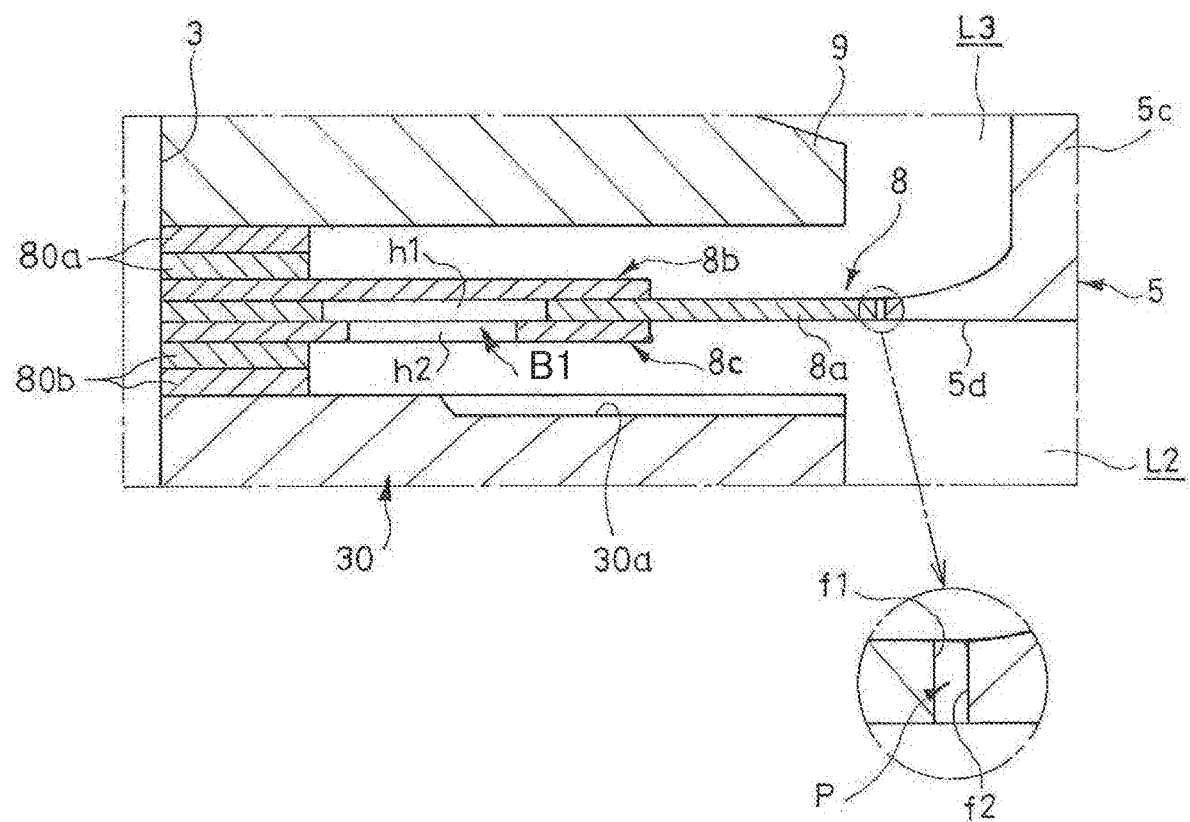
FIG. 3 is a partially enlarged view showing, in enlarged form, a part of FIG. 2.

Next, as shown in FIG. 3, the super-low speed valve 8 is configured to have a leaf valve 8a and first and second sub leaf valves 8b and 8c that are stacked on and under the leaf valve 8a, respectively. The leaf valve 8a and the first and second sub leaf valves 8b and 8c are each formed of a thin ring-shaped plate having an elasticity, and the outer diameters of the first and second sub leaf valves 8b and 8c are smaller than the outer diameter of the leaf valve 8a.

Furthermore, one or more spacers 80a and one or more spacers 80b, each of which has the outer diameter that is smaller than the outer diameter of the leaf valve 8a and the outer diameters of the first and second sub leaf valves 8b and 8c, are respectively stacked on and under the super-low speed valve 8. An inner circumference portion of the super-low speed valve 8 is fixed to the valve disc 5 by being clamped by the spacers 80a and 80b. On the other hand, a portion of the super-low speed valve 8 on the outer circumferential side with respect to the spacers 80a and 80b is allowed to be deflected both upward and downward. As described above, in this embodiment, the inner circumferences of the leaf valve 8a, and the first and second sub leaf valves 8b and 8c are formed as fixed ends and their outer circumferences are formed as free ends.

In addition, the leaf valve 8a is provided at a position at which an outer circumferential surface f1 forming an end surface of the free end thereof and an inner circumferential surface f2 of the opposing portion 5d are opposed to each other in a state in which the leaf valve 8a is not deflected. In other words, the opposing portion 5d of the valve disc 5 projects towards the outer circumferential surface (the end surface of the free end) f1 of the leaf valve 8a in the state in which the leaf valve 8a is not deflected, and the inner circumferential surface f2 of the opposing portion 5d forms an opposing surface that opposes to the outer circumferential surface f1 of the leaf valve 8a. In the above description, "the state in which the leaf valve 8a is not deflected" means that the leaf valve 8a is kept in a state in which no load is exerted (a state in which a natural length is maintained).

In the state in which the leaf valve 8a is not deflected, even in a state in which the outer circumferential surface f1 of the leaf valve 8a and the inner circumferential surface f2 of the opposing portion 5d are opposed to each other, a gap P is formed between the outer circumference (the free end) of the leaf valve 8a and the opposing portion 5d. Because the gap P is formed, vertical movement of the outer circumference (the free end) of the leaf valve 8a with respect to the opposing portion 5d is allowed. However, because the gap P is very small, the movement of the liquid through the gap P is negligible.

The pressure in the contraction side chamber L2 acts in the direction in which the outer circumference portion of the leaf valve 8a is deflected upward. On the other hand, the pressure in the intermediate chamber L3 acts in the direction in which the outer circumference portion of the leaf valve 8a is deflected downward. As a result, the outer circumference portion of the leaf valve 8a is deflected upward or downward by receiving the pressure in the contraction side chamber L2 or the pressure in the intermediate chamber L3, and the outer circumferential surface f1 is shifted vertically with respect to the inner circumferential surface f2 of the opposing portion 5d so that they come to no longer be opposed to each other. Consequently, the gap P formed between the outer circumference (the free end) of the leaf valve 8a and the opposing portion 5d is increased as the deflected amount of the leaf valve 8a is increased.

In addition, the leaf valve 8a and the second sub leaf valve 8c that is stacked under the leaf valve 8a are perforated leaf valves, and they are each formed with holes that penetrate in the axial direction (the thickness direction) in addition to the attachment hole (not shown with reference sign) that allows the insertion of the piston rod 3. In the following, in order to distinguish between the holes formed in the leaf valve 8a and the holes formed in the second sub leaf valve 8c, the former is referred to as main through holes h1 and the latter is referred to as sub through holes h2. In addition, a state in which the respective members forming the damping valve V are mounted on the outer circumference of the piston rod 3 is referred to as a mounted state.

Figure 4:
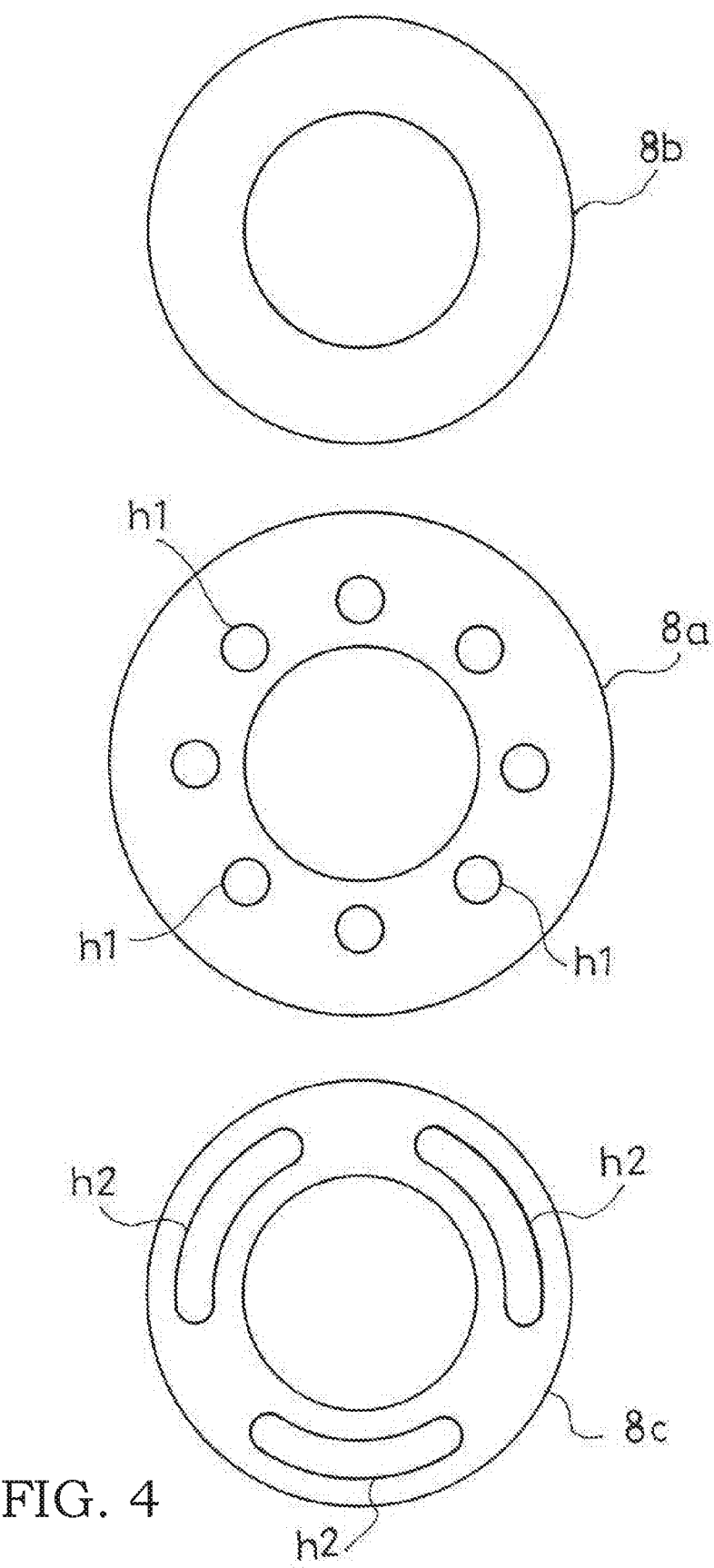
FIG. 4 is a plan view showing a leaf valve and first and second sub leaf valves of the damping valve that is the valve according to the embodiment of the present invention in a disassembled state.

As shown in FIG. 4, each of the main through holes h1 in the leaf valve 8*a* has a circular shape when viewed in a planar view, and eight main through holes h1 are arranged along the circumferential direction of the leaf valve 8*a*. On the other hand, each of sub through holes h2 in the second sub leaf valve 8*c* has an arc shape when viewed in a planar view, and three sub through holes h2 are arranged along the circumferential direction of the second sub leaf valve 8*c*. In this configuration, as shown in FIG. 3, when the leaf valve 8*a* and the second sub leaf valve 8*c* are in the mounted state, two or more main through holes h1 come to communicate with single sub through hole h2 even if the leaf valve 8*a* and the second sub leaf valve 8*c* are not aligned in the circumferential direction.

With such a configuration, lower ends of the main through holes h1 are prevented from being closed by the second sub leaf valve 8*c*, and thereby, a state in which the lower ends of the main through holes h1 are constantly opened is maintained. In order to prevent the lower ends of the main through holes h1 from being closed by the second sub leaf valve 8*c*, in the mounted state, the main through holes h1 and the sub through holes h2 may be arranged such that openings of the lower ends of the main through holes h1 and openings of upper ends of the sub through holes h2 are overlapped when viewed from the axial direction (when viewed from the one side in the axial direction). As long as such a positional relationship is achieved, numbers, shapes, and arrangements of the main through holes h1 and the sub through holes h2 may be changed arbitrarily. In addition, the main through holes h1 may be formed so as to have the arc shape when viewed in a planar view and so as to be arranged along the circumferential direction of the leaf valve 8*a*, and the sub through holes h2 may be formed so as to have the circular shape when viewed in a planar view and so as to be arranged along the circumferential direction of the second sub leaf valve 8*c*.

On the other hand, in this embodiment, the first sub leaf valve 8*b* that is stacked on the leaf valve 8*a* is a non-perforated leaf valve that does not have other holes than the attachment hole (not shown with reference sign) for allowing the insertion of the piston rod 3. As shown in FIG. 3, when the leaf valve 8*a* and the first sub leaf valve 8*b* are in the mounted state, an outer circumference of the first sub leaf valve 8*b* is positioned at the outer circumferential side relative to upper sides openings of the main through holes h1 of the leaf valve 8*a*.

With such a configuration, in a state in which the outer circumference of the first sub leaf valve 8*b* is in contact with an upper surface of the leaf valve 8*a*, the upper ends of the main through holes h1 are closed by the first sub leaf valve 8*b*. In addition, when the outer circumference portion of the leaf valve 8*a* shown in FIG. 3 is deflected upward by receiving the pressure in the contraction side chamber L2, the outer circumference portion of the first sub leaf valve 8*b* is also deflected upward so as to follow the leaf valve 8*a*, and therefore, the outer circumference of the first sub leaf valve 8*b* is kept in the state in which it is in contact with the upper surface of the leaf valve 8*a*, and the upper ends of the main through holes h1 are kept in the state in which they are closed by the first sub leaf valve 8*b*.

Figure 5:
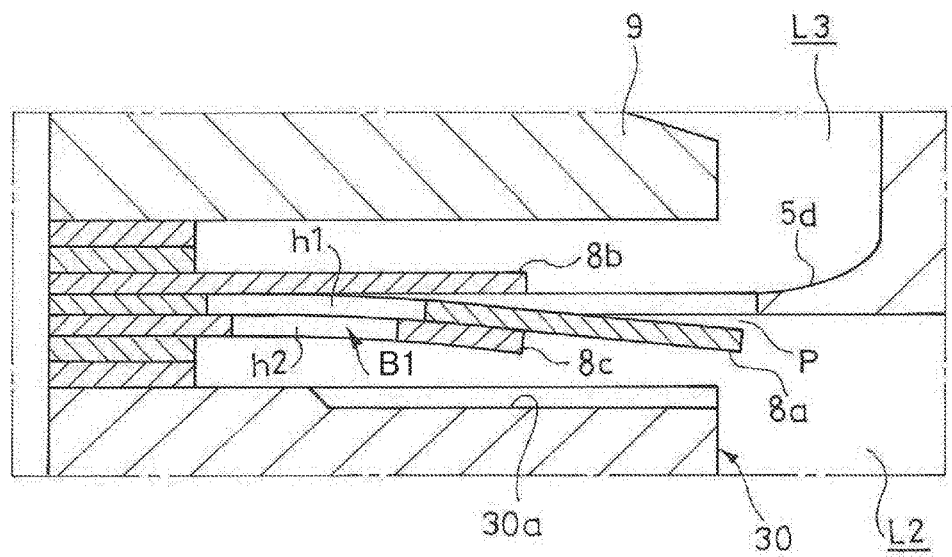
FIG. 5 is an explanatory diagram for explaining a state in which the leaf valve shown in FIG. 3 is deflected downward.

In contrast, as shown in FIG. 5, when the outer circumference portion of the leaf valve 8*a* is deflected downward by receiving the pressure in the intermediate chamber L3, the outer circumference of the first sub leaf valve 8*b* is separated away from the upper surface of the leaf valve 8*a*, and the upper ends of the main through holes h1 are opened. In a case in which the outer circumference portion of the leaf valve 8*a* is deflected downward, an outer circumference portion of the second sub leaf valve 8*c* is also deflected downward so as to follow the leaf valve 8*a*, and therefore, an outer circumference of the second sub leaf valve 8*c* is kept in a state in which it is in contact with a lower surface of the leaf valve 8*a*; however, the lower ends of the main through holes h1 are opened downward via the sub through holes h2.

Thus, the liquid in the intermediate chamber L3 can flow into the main through holes h1 through between the first sub leaf valve 8*b* and the leaf valve 8*a*, and then, can move into the contraction side chamber L2 through the main through holes h1 and the sub through holes h2. In other words, a first passage B1 is formed by the main through holes h1 and the sub through holes h2 so as to extend in parallel with the gap P that is formed between the outer circumference (the free end) of the leaf valve 8*a* and the opposing portion 5*d*. This first passage B1 is opened/closed by the first sub leaf valve 8*b*, the first sub leaf valve 8*b* opens the first passage B1 when the leaf valve 8*a* is deflected downward, and the flow of the liquid through the first passage B1 directed from the intermediate chamber L3 toward the contraction side chamber L2 is allowed.

In addition, as the amount of upward deflection of the leaf valve 8*a* and the first sub leaf valve 8*b* is increased by a certain degree, either one or both of the leaf valve 8*a* and the first sub leaf valve 8*b* are brought into contact with the valve stopper 9, and further deflection thereof is inhibited. As described above, the valve stopper 9 limits the amount of upward deflection of the leaf valve 8*a* and the first sub leaf valve 8*b*.

In contrast, as the amount of downward deflection of the leaf valve 8*a* and the second sub leaf valve 8*c* is increased by a certain degree, either one or both of the leaf valve 8*a* and the second sub leaf valve 8*c* are brought into contact with the nut 30, and further deflection thereof is inhibited. As described above, the nut 30 functions as a valve stopper that limits the amount of downward deflection of the leaf valve 8*a* and the second sub leaf valve 8*c*. It may be possible to provide, in addition to the nut 30, a valve stopper for limiting the amount of downward deflection of the leaf valve 8*a* and the second sub leaf valve 8*c*.

Furthermore, grooves 30*a* are formed in an upper end of the nut 30 so as to extend along the radial direction. The grooves 30*a* prevent the communication between the first passage B1 and the contraction side chamber L2 from being shut off when the leaf valve 8*a* or the second sub leaf valve 8*c* is brought into contact with the nut 30. The grooves 30*a* as described above may be formed in the super-low speed valve 8. In addition, holes may be formed in the nut (the valve stopper) 30 instead of the grooves 30*a*, and the communication through the first passage B1 when the first passage B1 is opened by the first sub leaf valve 8*b* may be ensured by these holes.

Operation of the shock absorber D provided with the damping valve (the valve) V according to this embodiment will be described below.

When the shock absorber D is extended, the piston 2 is moved upward in the cylinder 1 to compress the extension side chamber L1, and the liquid in the extension side chamber L1 is moved to the contraction side chamber L2 through the damping valve V. Because resistance is imparted to the flow of the liquid by the extension side main valve 6, the orifices formed by the notches 6*a* and 7*a* of the respective main valves 6 and 7, or the super-low speed valve 8, the pressure in the extension side chamber L1 is increased, and the shock absorber D exhibits an extension side damping force suppressing the extending operation.

In contrast, when the shock absorber D is contracted, the piston 2 is moved downward in the cylinder 1 to compress the contraction side chamber L2, and the liquid in the contraction side chamber L2 is moved to the extension side chamber L1 through the damping valve V. Because resistance is imparted to the flow of the liquid by the contraction side main valve 7, the orifices formed by the notches 6a and 7a of the respective main valves 6 and 7, or the super-low speed valve 8, the pressure in the contraction side chamber L2 is increased, and the shock absorber D exhibits a contraction side damping force suppressing the contracting operation.

With the above-described shock absorber D, the extension side main valve 6 and the contraction side main valve 7 are opened or the outer circumference portion of the leaf valve 8a of the super-low speed valve 8 is deflected upward/downward in accordance with the piston speed, and so, a damping force characteristic (the characteristic of the damping force relative to the piston speed) is varied.

More specifically, in a case in which the speed of the piston 2 (the piston speed) is very slow and falls within a super-low speed range at which the piston speed is close to 0 (zero), such as when the movement of the shock absorber D is just started, the extension side main valve 6 and the contraction side main valve 7 are closed. On the other hand, the outer circumference portion of the leaf valve 8a of the super-low speed valve 8 is deflected downward when the shock absorber D is being extended or upward when the shock absorber D is being contracted, and thus, the outer circumferential surface f1 of the leaf valve 8a is shifted vertically with respect to the inner circumferential surface f2 of the opposing portion 5d so that they come to no longer be opposed to each other.

In this case, the liquid that flows back and forth between the extension side chamber L1 and the contraction side chamber L2 passes through the orifices formed by the notches 6a and 7a of the respective main valves 6 and 7, the intermediate chamber L3, and the gap P that is formed between the outer circumference of the leaf valve 8a and the inner circumference of the opposing portion 5d that have been vertically shifted from each other. In addition, at the time when the shock absorber D is extended, the first passage B1 is opened as the outer circumference of the first sub leaf valve 8b is separated away from the upper surface of the leaf valve 8a that is deflected downward. In the super-low speed range, although an opening area of a flow channel formed by combining the first passage B1 and the gap P at the time of the extension and an opening area of the gap P at the time of the contraction are respectively increased as the piston speed is increased, the opening area is smaller than an opening area of the all orifices formed by the notches 6a and 7a of the respective main valves 6 and 7.

Therefore, when the piston speed falls within the super-low speed range, for the pressure loss caused when the liquid is moved between the extension side chamber L1 and the contraction side chamber L2, at the time when the shock absorber D is extended, the pressure loss caused by the flow channel formed by combining the gap P, which is formed between the outer circumference of the leaf valve 8a and the inner circumference of the opposing portion 5d, and the first passage B1 becomes dominant, and at the time when the shock absorber D is contracted, the pressure loss caused by the gap P becomes dominant. In turn, both at the time when the shock absorber D is extended and at the time when the shock absorber D is contracted, the damping force characteristic in the super-low speed range becomes the characteristic specific to the valve that is proportional to the piston speed. In the above, the arrangement positions of the main through holes h1 of the leaf valve 8a may be set so as to be closer to the inner circumference of the leaf valve 8a than the positions shown in FIG. 5, or the outer circumference portion of the leaf valve 8a that is not supported by the sub leaf valve 8c may be set so as to be deflected more easily when pressure is applied from the intermediate chamber L3 side. With such a configuration, the first passage B1 is set so as not to be opened when the piston speed falls within the super-low speed range, and the first passage B1 is set so as to be opened when the piston speed falls within a low speed range or a middle-high speed range.

Even in a state in which the outer circumferential surface f1 of the leaf valve 8a and the inner circumferential surface f2 of the opposing portion 5d are opposed to each other as described above, a minute gap is formed between them. Therefore, it may be possible to set such that the liquid passes through the minute gap in a lower-speed side region in the super-low speed range. In such a case, in the lower-speed side region in the super-low speed range, the pressure loss caused by the minute gap becomes dominant, and the damping force characteristic becomes the characteristic specific to the orifice that is proportional to the square of the piston speed, whereas in a higher-speed side region in the super-low speed range, the damping force characteristic becomes the characteristic specific to the valve.

Next, in a case in which the piston speed is increased and falls outside the super-low speed range but falls within the low speed range, similarly to the case in which the piston speed falls within the super-low speed range, the extension side main valve 6 and the contraction side main valve 7 are closed. On the other hand, the deflected amount of the outer circumference portion of the leaf valve 8a of the super-low speed valve 8 is increased, and thereby, the opening area of the flow channel formed by combining the gap P and the first passage B1 at the time when the shock absorber D is extended and the opening area of the gap P at the time when the shock absorber D is contracted each becomes larger than the opening area of the all orifices formed by the notches 6a and 7a of the respective main valves 6 and 7.

Therefore, in a case in which the piston speed falls within the low speed range, for the pressure loss caused when the liquid is moved between the extension side chamber L1 and the contraction side chamber L2, the pressure loss caused by the orifices formed by the notches 6a and 7a becomes dominant. In turn, the damping force characteristic in the low speed range becomes the characteristic specific to the orifice that is proportional to the square of the piston speed.

Next, in a case in which the piston speed is further increased and falls outside the low speed range but falls within the middle-high speed range, the extension side main valve 6 is opened at the time when the shock absorber D is extended, and the contraction side main valve 7 is opened at the time when the shock absorber D is contracted. Furthermore, the deflected amount of the leaf valve 8a of the super-low speed valve 8 is increased compared with the case in which the piston speed falls within the low speed range, thereby increasing the gap P formed between the outer circumference of the leaf valve 8a and the inner circumference of the opposing portion 5d that have been vertically shifted from each other.

In this case, the liquid that flows back and forth between the extension side chamber L1 and the contraction side chamber L2 passes through: a gap (an opening portion) that is formed between the valve disc 4 and the outer circumference portion of the extension side main valve 6 or the contraction side main valve 7 when the extension side main valve 6 or the contraction side main valve 7 is opened; the intermediate chamber L3; the gap P that is formed between the outer circumference of the leaf valve 8a and the inner circumference of the opposing portion 5d that have been vertically shifted from each other; and the first passage B1 that is formed in the leaf valve 8a at the time when the shock absorber D is extended. In the middle-high speed range, the gap P is large, and the liquid can pass through with a relatively low resistance.

Therefore, in a case in which the piston speed falls within the middle-high speed range, for the pressure loss caused when the liquid is moved between the extension side chamber L1 and the contraction side chamber L2, the pressure loss caused by the opening portion of the extension side main valve 6 or the contraction side main valve 7 becomes dominant. In turn, the damping force characteristic in the middle-high speed range becomes the characteristic specific to the valve that is proportional to the piston speed, and the gradient becomes smaller compared with that in the low speed range. In addition, in a case in which the main valve 6 or 7 is fully opened at some point in the middle-high speed range, the damping force characteristic is shifted to the characteristic specific to the port at the speed at which the main valve 6 or 7 is fully opened as the boundary, and the gradient is increased again.

In the following, operational advantages of the damping valve (the valve) V according to this embodiment and the shock absorber D provided with the damping valve V will be described.

The damping valve (the valve) V according to this embodiment includes: the ring-shaped leaf valve 8a having the outer circumference as the free end, the free end being allowed to be deflected toward both sides in the axial direction; the ring-shaped opposing portion 5d that opposes the outer circumference (the free end) of the leaf valve 8a with the gap P; the first sub leaf valve (the sub leaf valve) 8b stacked on the upper side (the one side in the axial direction) of the leaf valve 8a; and the first passage B1 formed in the leaf valve 8a so as to extend in parallel with the gap P, the first passage B1 being configured to be opened when the leaf valve 8a is deflected in the direction away from the first sub leaf valve 8b. In other words, the damping valve V includes: the ring-shaped leaf valve 8a having the outer circumference as the free end, the free end being allowed to be deflected toward the both sides in the axial direction; the ring-shaped opposing portion 5d that opposes the free end of the leaf valve 8a with the gap P; the first sub leaf valve 8b stacked on the one side of the leaf valve 8a in the axial direction; and the first passage B1 formed in the leaf valve 8a so as to extend in parallel with the gap P, the first passage B1 being configured to be opened when the leaf valve 8a is deflected in the direction away from the first sub leaf valve 8b.

According to the above-described configuration, when the leaf valve 8a is deflected and the first passage B1 is opened, the liquid can pass through both of the first passage B1 and the gap P. Thus, compared with a leaf valve without the first passage B1, even if the deflected amount is the same, the flow amount of the liquid passing through the leaf valve 8a is increased by an amount the liquid is allowed to pass through the first passage B1. As described above, according to the above-described configuration, because the flow amount relative to the deflected amount of the leaf valve 8a is increased, it is possible to improve the durability of the leaf valve 8a by suppressing the increase in the deflected amount of the leaf valve 8a while ensuring the flow amount of the liquid passing through the leaf valve 8a.

In addition, the damping valve (the valve) V according to this embodiment further includes the second sub leaf valve 8c stacked on the lower side (the other side in the axial direction) of the leaf valve 8a. In addition, the leaf valve 8a is formed with the main through holes h1, the main through holes h1 penetrating the leaf valve 8a in the thickness direction (the axial direction), and the second sub leaf valve 8c is formed with the sub through holes h2 at positions overlapping with the main through holes h1 when viewed from the axial direction, the sub through holes h2 penetrating the second sub leaf valve 8c in the thickness direction (the axial direction). The first passage B1 is then formed by the main through holes h1 and the sub through holes h2, the first passage B1 being configured to be opened/closed by the first sub leaf valve 8b. In other words, the damping valve V further includes the second sub leaf valve 8c stacked on the other side of the leaf valve 8a in the axial direction, wherein: the leaf valve 8a is formed with the main through holes h1, the main through holes h1 penetrating the leaf valve 8a in the axial direction; the second sub leaf valve 8c is formed with the sub through holes h2 at positions overlapping with the main through holes h1, the sub through holes h2 penetrating the second sub leaf valve 8c in the axial direction; and the first passage B1 is formed by the main through holes h1 and the sub through holes h2, the first passage B1 being configured to be opened/closed by the first sub leaf valve 8b.

According to the above-described configuration, it is possible to easily form the first passage B1 that is opened when the leaf valve 8a is deflected in the direction away from the first sub leaf valve 8b. Furthermore, the opening area of the first passage B1 can be changed by changing overlapping amount between the main through holes h1 and the sub through holes h2, and therefore, it is possible to easily adjust the opening area of the first passage B1. Because the opening area of the first passage B1 is a tuning factor for the damping force generated in the middle-high speed range, according to the above-described configuration, it is possible to easily perform the tuning of the damping force.

Figure 6:
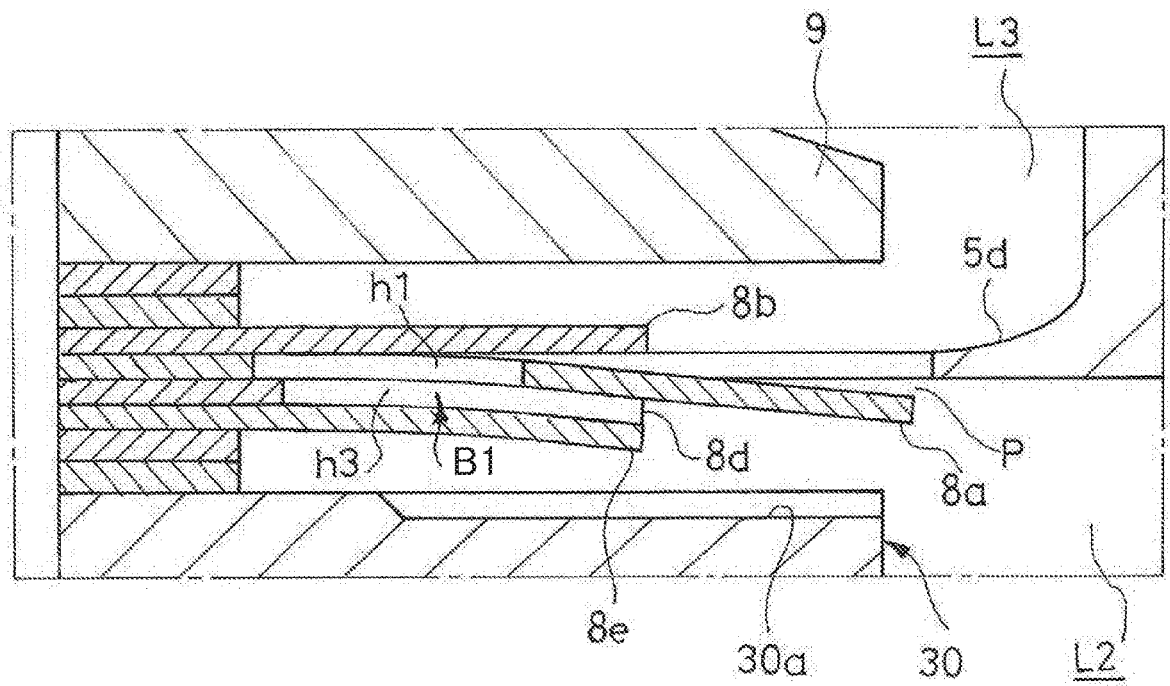
FIG. 6 is an explanatory diagram for showing a first modification of the damping valve that is the valve according to the embodiment of the present invention and for explaining a state in which the leaf valve of the damping valve according to this modification is deflected downward.
Figure 7:
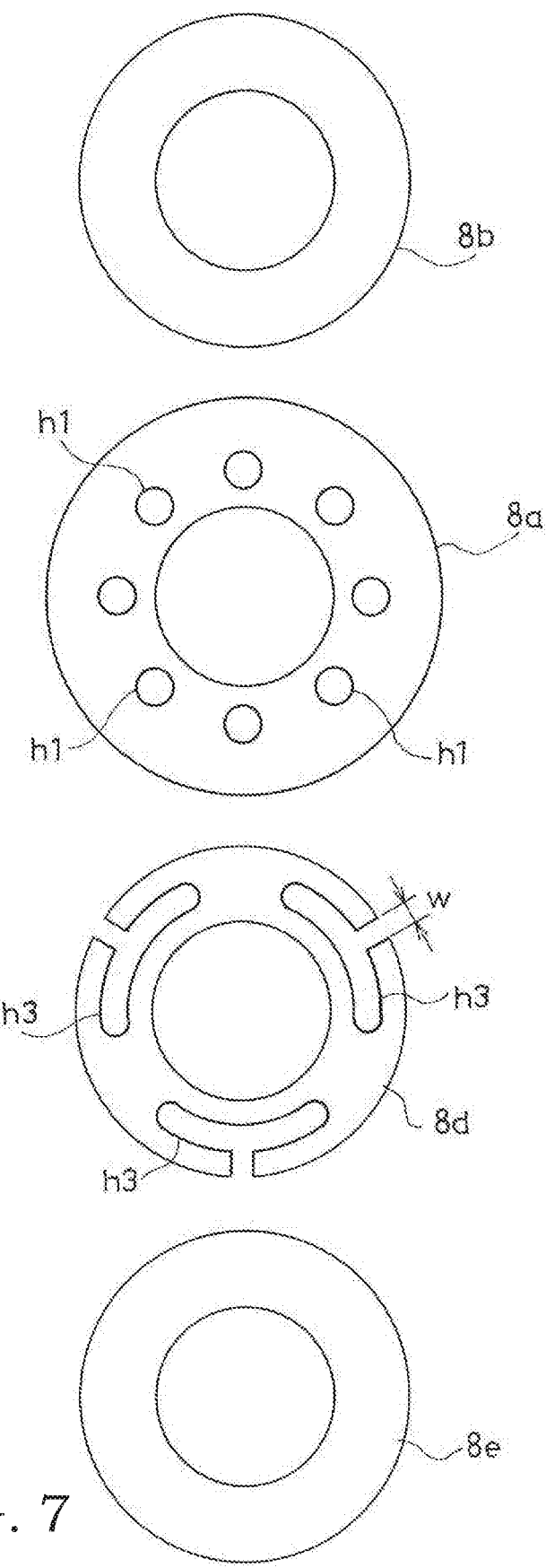
FIG. 7 is a plan view showing, in a disassembled state, the leaf valve and first, second, and third sub leaf valves of the damping valve according to the first modification shown in FIG. 6.

The second sub leaf valve 8c may be omitted or modified. For example, in the damping valve according to the first modification in which the second sub leaf valve is modified, as shown in FIGS. 6 and 7, a second sub leaf valve 8d that is stacked on the lower side (the other side in the axial direction) of the leaf valve 8a is formed with notches h3 that penetrate the second sub leaf valve 8d in the thickness direction (the axial direction) and that open to the side. The notches h3 are formed at positions overlapping with the main through holes h1 when viewed from the axial direction. A third sub leaf valve 8e is then stacked on the other side of the second sub leaf valve 8d from the leaf valve 8a. The first passage B1 is formed by the main through holes h1 and gaps that are formed by the notches h3 between the leaf valve 8a and the third sub leaf valve 8e, and the first passage B1 is opened/closed by the first sub leaf valve 8b. In other words, the damping valve according to the first modification further includes: the second sub leaf valve 8d stacked on the other side of the leaf valve 8a in the axial direction; and the third sub leaf valve 8e stacked on the second sub leaf valve 8d, wherein the leaf valve 8a is formed with the main through holes h1, the main through holes h1 penetrating the leaf valve 8a in the axial direction, the second sub leaf valve 8d is formed with the notches h3 at positions overlapping with the main through holes h1, the notches h3 penetrating the second sub leaf valve 8d in the axial direction, and the notches h3 opening to the side, and the first passage B1 is formed by the main through holes h1 and the gaps, the first passage B1 being configured to be opened/closed by the first sub leaf valve 8b, and the gaps being formed by the notches h3 between the leaf valve 8a and the third sub leaf valve 8e.

Also in such a case, it is possible to easily form the first passage B1 that is opened when the leaf valve 8a is deflected in the direction away from the first sub leaf valve 8b. Furthermore, because the opening area of the first passage B1 can be changed by changing widths w of opening portions of the notches h3 to the side of the second sub leaf valve 8d (see FIG. 7) (in other words, by changing the shapes of the notches h3), it is possible to more easily perform the adjustment of the opening area of the first passage B1. Because the opening area of the first passage B1 is the tuning factor for the damping force generated in the middle-high speed range, according to the above-described configuration, it is possible to more easily perform the tuning of the damping force.

In addition, in a case in which the above-described second and third sub leaf valves 8d and 8e are provided, after the leaf valve 8a is separated from the first sub leaf valve 8b and the first passage B1 is opened, the third sub leaf valve 8e may further be separated from the second sub leaf valve 8d such that the opening area of the first passage B1 is increased by one more stage. As described above, with the damping valve according to the first modification, it may be possible to open the first passage B1 in two stages.

Furthermore, in addition to the passage that is opened when the leaf valve 8a is deflected in the one direction, the leaf valve 8a may also be provided with a passage that is opened when the leaf valve 8a is deflected in the other direction. For example, as shown in FIGS. 8 and 9, the damping valve according to a second modification is formed with: a first sub leaf valve 8g that is stacked on the upper side of a leaf valve 8f; and the first passage B1 that is formed in the leaf valve 8f so as to extend in parallel with the gap P and that is opened when the leaf valve 8f is deflected in the direction away from the first sub leaf valve 8g; and in addition, a second sub leaf valve 8h that is stacked on the lower side of the leaf valve 8f; and a second passage B2 that is formed in the leaf valve 8f so as to extend in parallel with the gap P and that is opened when the leaf valve 8f is deflected in the direction away from the second sub leaf valve 8h. In other words, the damping valve according to the second modification further includes: the second sub leaf valve 8h stacked on the other side of the leaf valve 8f in the axial direction; and the second passage B2 formed in the leaf valve 8f so as to extend in parallel with the gap P, and the second passage B2 being configured to be opened when the leaf valve 8f is deflected in the direction away from the second sub leaf valve 8h.

Figure 8A:
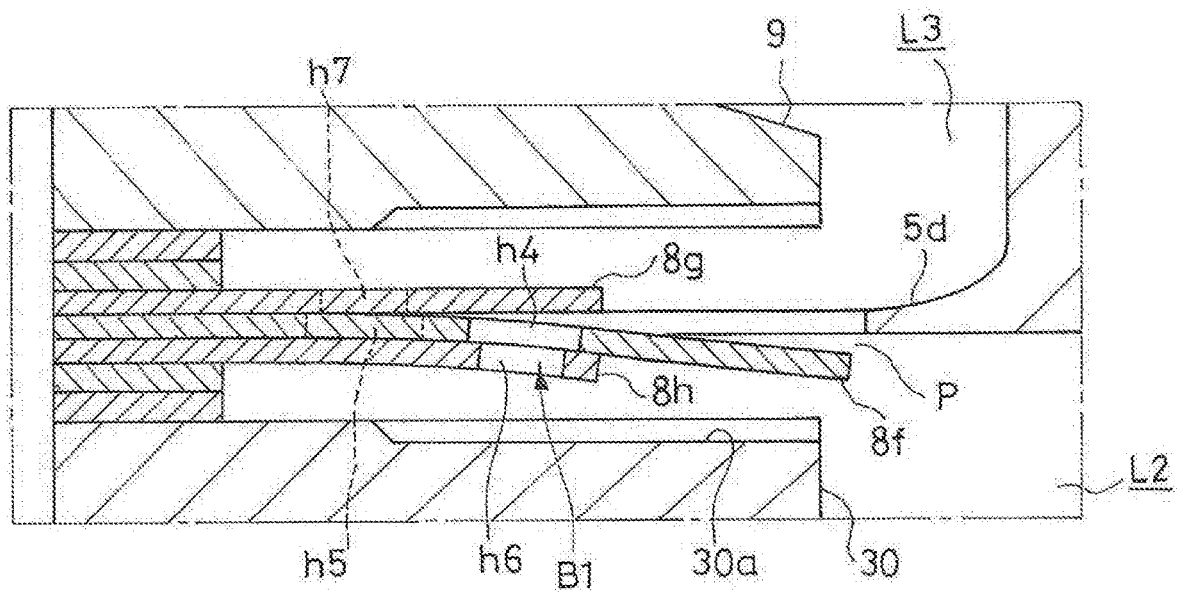
FIG. 8A is an explanatory diagram for showing a second modification of the damping valve that is the valve according to the embodiment of the present invention and for explaining a state in which the leaf valve of the damping valve according to the modification is deflected downward.
Figure 8B:
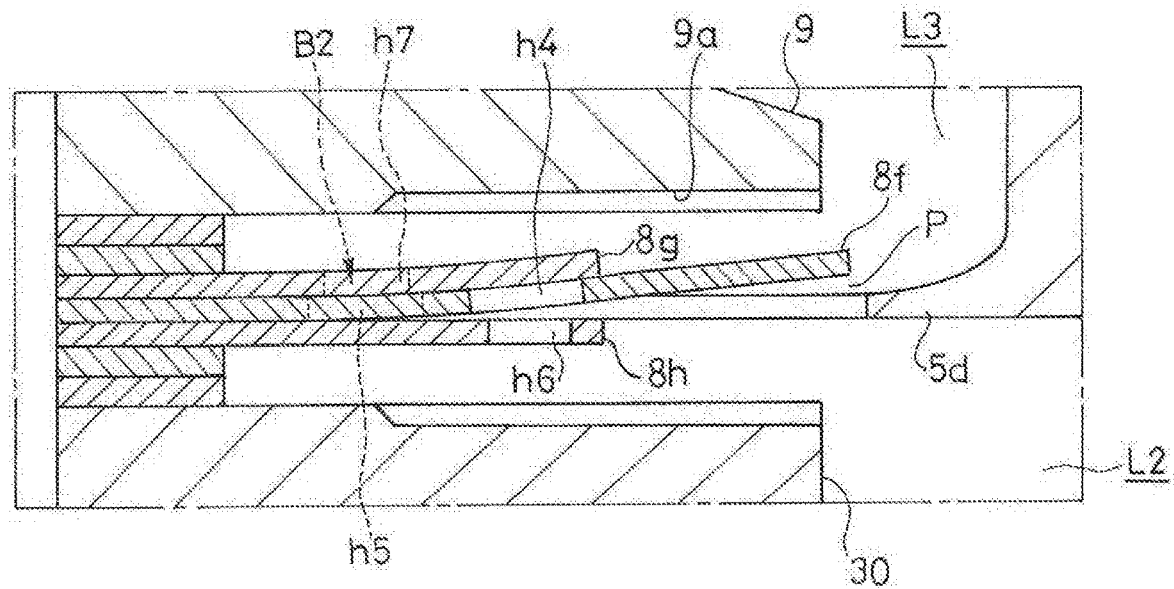
FIG. 8B is an explanatory diagram for explaining a state in which the leaf valve shown in FIG. 8A is deflected upward.
Figure 9:
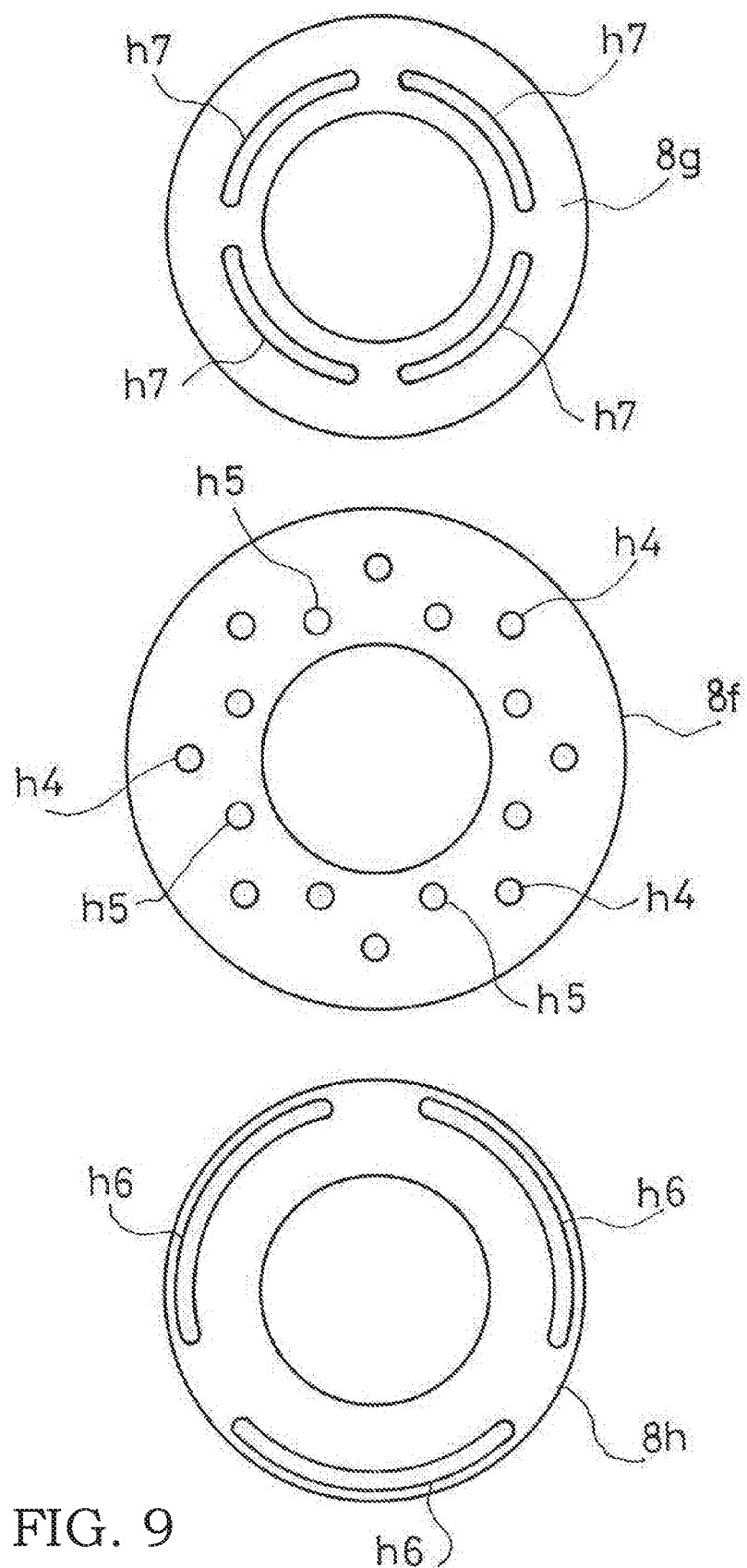
FIG. 9 is a plan view showing the leaf valve and the first and second sub leaf valves of the damping valve according to the second modification shown in FIG. 8A and FIG. 8B in a disassembled state.

According to the above-described configuration, also in a case shown in FIG. 8A in which the liquid is directed from the intermediate chamber L3 to the contraction side chamber L2 by deflecting the leaf valve 8f downward and in a case shown in FIG. 8B in which the liquid is directed from the contraction side chamber L2 to the intermediate chamber L3 by deflecting the leaf valve 8f upward, it is possible to suppress, in both cases, the increase in the deflected amount of the leaf valve 8f while ensuring the flow amount of the liquid passing through the leaf valve 8f. Therefore, it is possible to further improve the durability of the leaf valve 8f.

Furthermore, in the damping valve according to the second modification, the leaf valve 8f is formed with first and second main through holes h4 and h5 that penetrate the leaf valve 8f in the thickness direction (the axial direction), the second sub leaf valve 8h is formed with second sub through holes h6, which penetrate the second sub leaf valve 8h in the thickness direction (the axial direction), at positions overlapping with the first main through holes h4 when viewed from the axial direction, and the first sub leaf valve 8g is formed with first sub through holes h7, which penetrate the first sub leaf valve 8g in the thickness direction (the axial direction), at positions overlapping with the second main through holes h5 when viewed from the axial direction. In other words: the leaf valve 8f is formed with the first main through holes h4 and the second main through holes h5, the first main through holes h4 and the second main through holes h5 penetrating the leaf valve 8f in the axial direction; the first sub leaf valve 8g is formed with the first sub through holes h7 at the positions overlapping with the second main through holes h5, the first sub through holes h7 penetrating the first sub leaf valve 8g in the axial direction; and the second sub leaf valve 8h is formed with the second sub through holes h6 at the positions overlapping with the first main through holes h4, the second sub through holes h6 penetrating the second sub leaf valve 8h in the axial direction.

The first passage B1 is then formed by the first main through holes h4 and the second sub through holes h6, the first passage B1 being configured to be opened/closed by the first sub leaf valve 8g. On the other hand, the second passage B2 is formed by the second main through holes h5 and the first sub through holes h7, the second passage B2 being configured to be opened/closed by the second sub leaf valve 8h. In other words, the first passage B1 is formed by the first main through holes h4 and the second sub through holes h6, the first passage B1 being configured to be opened/closed by the first sub leaf valve 8g, and the second passage B2 is formed by the second main through holes h5 and the first sub through holes h7, the second passage B2 being configured to be opened/closed by the second sub leaf valve 8h. According to the above-described configuration, it is possible to easily form the first and second passages B1 and B2, and at the same time, because the opening areas of the respective passages B1 and B2 can be adjusted individually with ease, it is possible to easily perform the tuning of the damping force generated during both contraction and extension.

In addition, in the damping valve according to the second modification, the first main through holes h4 are formed on the outer circumferential side with respect to the second main through holes h5. With such a configuration, it is easy to achieve the communication between the first main through holes h4 and the second sub through holes h6 and the communication between the second main through holes h5 and the first sub through holes h7 without performing alignment of the leaf valve 8f, the first sub leaf valve 8g, and the second sub leaf valve 8h in the circumferential direction.

However, the first main through holes h4 may be formed on the inner circumferential side with respect to the second main through holes h5, and the first and second main through holes h4 and h5 may be arranged on the same circle as long as the alignment of the leaf valve 8f, the first sub leaf valve 8g, and the second sub leaf valve 8h in the circumferential direction is performed. Thus, the first main through holes h4 may be formed on the outer circumferential side or the inner circumferential side with respect to the second main through holes h5. Furthermore, even in a case in which the first and second passages B1 and B2 are formed in the leaf valve 8f as in the damping valve according to the second modification, the first and second passages B1 and B2 may be formed by using the notched leaf valve (the second sub leaf valve 8d) shown in FIGS. 6 and 7 and the non-perforated leaf valve (the third sub leaf valve 8e).

In addition, in the damping valve according to the second modification, grooves 9a and 30a extending along the radial direction are respectively formed in the lower end of the valve stopper 9 and the upper end of the nut (the valve stopper) 30. The grooves 30a of the nut 30 ensure the communication through the first passage B1 when the first passage B1 is opened by the first sub leaf valve 8g. On the other hand, the grooves 9a of the valve stopper 9 ensure the communication through the second passage B2 when the second passage B2 is opened by the second sub leaf valve 8h. However, as described above, the hole may be used instead of the grooves 30a and 9a.

In addition, in the respective embodiments, although the inner circumferences of the leaf valves 8a and 8f and the respective sub leaf valves 8b, 8c, 8d, 8e, 8g, and 8h are formed as the fixed ends and the outer circumferences thereof are formed as the free ends, their outer circumferences may be formed as the fixed ends, and their inner circumferences may be formed as the free ends. In other words, the leaf valves 8a and 8f may be each formed to have the ring shape and to have either one of the outer circumference and the inner circumference as the free end such that the deflection in the both sides in the axial direction is allowed. In addition, in this embodiment, the leaf valves and the sub leaf valves according to the present invention are used in the super-low speed valve 8 that is arranged in series with respect to the main valves 6 and 7. However, the leaf valves and the sub leaf valves according to the present invention may also be used as the main valves. Furthermore, in the above description, although the piston speed range is sectioned into the super-low speed range, the low speed range, and the middle-high speed range, threshold values for respective ranges may be set arbitrarily.

In addition, the damping valve (the valve) V according to this embodiment is used in the shock absorber D. The shock absorber D includes: the cylinder 1; and the piston rod 3 inserted into the cylinder 1 so as to be movable in the axial direction; wherein the damping valve V is configured to impart resistance to the flow of the liquid, the flow being generated when the cylinder 1 and the piston rod 3 are moved relative to each other in the axial direction. In other words, the shock absorber D includes: the cylinder 1; the piston rod 3 inserted into the cylinder 1 so as to be movable in the axial direction; and the damping valve V, wherein the damping valve V is configured to impart the resistance to the flow of the liquid that is generated when the cylinder 1 and the piston rod 3 are moved relative to each other in the axial direction. Therefore, when the shock absorber D is extended/contracted and the cylinder 1 and the piston rod 3 are moved relative to each other in the axial direction, the damping force caused by the resistance in the damping valve (the valve) V can be generated.

The damping valve (the valve) V according to this embodiment is provided in the piston portion that is mounted on the piston rod 3 of the shock absorber D. However, the rod that moves into and out from and the cylinder 1 may not necessarily be the piston rod that is installed with the piston, and the position for providing the damping valve V is not limited to the piston portion. For example, as described above, in a case in which the shock absorber is provided with the reservoir, the valve according to the embodiment of the present invention may be provided at an intermediate position in the passage through which the cylinder 1 and the reservoir are communicated.

In the above, although a detailed description is given of preferred embodiments of the present invention, alterations, variations, and modifications are possible within a range that does not depart from the claims.

Although the embodiments of the present invention have been described above, the above-mentioned embodiments are merely illustrations of parts of application examples of the present invention, and there is no intention to limit the technical scope of the present invention to the specific configuration of the above-mentioned embodiments.

The present application claims a priority based on Japanese Patent Application No. 2019-201178 filed on Nov. 6, 2019 before the Japan Patent Office, the entire contents of which are incorporated herein by reference.

The invention claimed is:

1. A valve assembly, comprising:
a ring-shaped main leaf valve having either one of an outer circumference or an inner circumference as a free end, the free end being allowed to be deflected toward both sides in an axial direction of the main leaf valve;
a ring-shaped opposing portion that faces the free end of the main leaf valve with a first gap in a radial direction of the main leaf valve;
a first sub leaf valve stacked on one side of the main leaf valve in the axial direction;
a first passage formed in the main leaf valve so as to extend in parallel with the first gap and being configured to be opened when the main leaf valve is deflected in a direction away from the first sub leaf valve;
a second sub leaf valve stacked on another side of the main leaf valve in the axial direction; and
a second passage formed in the main leaf valve so as to extend in parallel with the first gap and being configured to be opened when the main leaf valve is deflected in a direction away from the second sub leaf valve, wherein
the main leaf valve has a first main through hole and a second main through hole, the first main through hole and the second main through hole penetrating through the main leaf valve in the axial direction,
the first sub leaf valve has a first sub through hole at a position overlapping the second main through hole, the first sub through hole penetrating through the first sub leaf valve in the axial direction,
the second sub leaf valve has a second sub through hole at a position overlapping the first main through hole, the second sub through hole penetrating through the second sub leaf valve in the axial direction,
the first passage is formed by the first main through hole and the second sub through hole, the first passage being configured to be closed by the first sub leaf valve, and
the second passage is formed by the second main through hole and the first sub through hole, the second passage being configured to be closed by the second sub leaf valve.

2. The valve assembly according to claim 1, wherein the first main through hole is formed on an outer circumferential side or an inner circumferential side with respect to the second main through hole.

* * * * *